United States Patent Office 3,240,661
Patented Mar. 15, 1966

3,240,661
HIGH EXPANSION GLASS, AND SEALS
Clarence L. Babcock, Toledo, Ohio, assignor to Owens-Illinois Glass Company, a corporation of Ohio
No Drawing. Filed May 17, 1962, Ser. No. 195,393
9 Claims. (Cl. 161—196)

This invention relates to glass compositions, which glass compositions have properties making them particularly suitable for sealing to high expansion metals. In another aspect the invention relates to glass-to-metal seals.

Most common metals and alloys have high expansion coefficients which are incompatible with the lower expansion coefficients of normal silica-lime-soda glasses. Some so-called solder glasses, or soft glasses, having relatively high expansion coefficients, are known, but these glasses are usually only satisfactory for use as a sealing medium between a metal part and a hard glass part, not as a structural component. What is desired is a thermally resistant glass, that is, a glass having an annealing point of more than 325° C., that can be successfully sealed directly to high expansion metals. The glasses must also have a sufficiently high coefficient of thermal expansion and an acceptable chemical durability; furthermore, in the molten state they should be sufficiently fluid to adequately wet the metal and thereby form a satisfactory seal.

It is an object of the present invention to provide relatively hard glasses which have properties making them suitable for sealing directly to high expansion metals, such as copper and iron.

A further object of the invention is to provide a glass-to-metal seal.

Other objects, as well as aspects and advantages of the invention, will become apparent from a consideration of the accompanying specification.

According to the present invention there is provided a family of glass compositions having an expansion coefficient (0–300° C.) in the range from 115 to $155 \times 10^{-7}$. The glass compositions of the invention contain 29–56 weight percent $SiO_2$, 8–24 weight percent $Na_2O$, 8–24 weight percent $K_2O$, 0–4 weight percent $LiO_2$, 3–28 weight percent $TiO_2$, 0–6 weight percent $Al_2O_3$, 0–11 weight percent CaO, 0–11 weight percent MgO, a total alkali metal oxide content from 24–36 weight percent, a total CaO+MgO content from 4–11 weight percent, a total $SiO_2+Al_2O_3+TiO_2$ content from 54–70 weight percent, and the sum of the total alkali metal oxide content plus the $TiO_2$ content is a maximum of 61 weight percent. The glasses of the invention have annealing points of over 325° C., and fiber softening points below 670° C.

The more usual ranges for the calcium oxide and magnesium oxide components of the glasses of the invention are 2.5–7 weight percent CaO and 1.5–6 weight percent MgO.

As will be understood, the large amounts of alkali metal oxides are employed in order to obtain the desired high coefficients of expansion. However, since these components decrease the chemical durability and generally tend to decrease the fiber softening point, as well as the viscosity above the fiber softening point, it was not a simple matter to discover a glass having suitable overall properties. Thus, one cannot merely increase the alkali metal oxide in an ordinary soda-lime-silica glass so as to obtain a glass of the desired expansion range, since such glasses are deficient in chemical durability, viscosity relationships and other properties.

The necessity for the titanium dioxide component is to increase the fluidity of the composition. Substitution of titanium dioxide for silica raises the annealing point of a glass otherwise defined by the composition ranges of the present invention and lowers the fiber softening point. The glasses of the invention are, because of the presence of the titanium dioxide, more fluid at a given temperature differential above their fiber softening points. This is of great practical importance in use of the present glasses for obtaining good sealing contacts when preparing a seal with a metal.

While the $TiO_2$ content of the present family of glasses is from 3–38 weight percent, the more usual range is from 10–26 weight percent, it will be noted that Examples 17 and 20 differ only in that Example 20 replaces a portion of the silica with additional $TiO_2$. The result is a lowering of the fiber softening point and some increase in the annealing point. A similar comparison can be made between Examples 1 and 4, where the increased amount of $TiO_2$ in Example 4 also results in a lowering of the fiber softening point and some increase in the annealing point.

The calcium and magnesium oxides are glass network modifiers and are useful for, among other things, control of the expansion characteristics of the glass. More importantly, their substitution for silicas lowers the fiber softening point and the annealing point. The alkaline earth metal oxides, barium oxide and strontium oxide, could also contribute to the lowering of the viscosity of glasses of the general nature of the invention, but one obtains an undesirably drastic increase of the coefficient of thermal expansion and the chemical durability of comparable glasses containing barium oxide and strontium oxide instead of the same amounts of calcium oxide and magnesium oxide is undesirably much lower. This can be seen by comparing the chemical durability data for Example 34 with Example 11 and comparing the data of Example 33 with the data of Example 32. In addition, of course, it is commercially important that the glasses 11 and 32 of the invention are less costly than the corresponding glasses containing barium and strontium oxides, since the raw materials for barium and strontium oxides are much more expensive. As a consequence of the deleterious effect of barium oxide and strontium oxide, particularly with respect to chemical durability, these oxides, if included in a glass of the invention at all, must be in minor proportions, and limited, either singly or in the aggregate, to a maximum amount of about 1.5 weight percent.

Because lithium oxide drastically lowers the viscosity of a melt to a point where it sometimes lowers the stability of the glass, it is usually preferable that, when the total alkali metal oxide content is near the upper part of the defined range, the lithium oxide content not be in the upper part of its defined range, especially if the sum total of the $TiO_2+$ alkali metal oxide content is near the upper limit of 61 weight percent.

It will be understood that minor proportions of other constituents can be present in the glasses of the invention so long as they do not materially or significantly adversely affect the desired properties of the glasses. Thus, for instance, small proportions of the usual colorant oxides are generally harmless, since such oxides are seldom employed in amounts greater than 1 weight percent of the total glass composition.

Typical glass compositions of the invention are given in Table I as follows:

This glass compositions were all made in the conventional manner by melting mixtures of conventional powdered batch raw materials in a furnace. Thus, the various batch materials such as carbonates, silicates, oxides,

TABLE I

| Example No. | 1 | 2 | 3 | 4 | 5 | 6 | 7 | 8 | 9 | 10 | 11 | 12 |
|---|---|---|---|---|---|---|---|---|---|---|---|---|
| Component: | | | | | | | | | | | | |
| $SiO_2$ | 52.5 | 49.9 | 52.5 | 42.5 | 49.5 | 39.9 | 42.5 | 45 | 40 | 50.4 | 50.5 | 40 |
| $Al_2O_3$ | 2.7 | 4.9 | 2.5 | 2.8 | ---- | 5.1 | 2.5 | ---- | ---- | 2.6 | 2.5 | 2.5 |
| CaO | 3 | 3 | 2.9 | 3.1 | 6 | 3 | 2.9 | 5.8 | 5.9 | 3.1 | 2.9 | 5.5 |
| MgO | 2.2 | 2.1 | 2.1 | 1.9 | 4.3 | 2.1 | 2.1 | 4.2 | 4.2 | 2.1 | 2.1 | 4 |
| $Na_2O$ | 11.3 | 13 | 12.5 | 12 | 11.7 | 12.8 | 12.5 | 11.5 | 11.9 | 9.3 | 18 | 10 |
| $K_2O$ | 11.8 | 11.9 | 12.5 | 11 | 11.2 | 12.1 | 12.5 | 11.5 | 10.9 | 18 | 9 | 20 |
| $Li_2O$ | ---- | ---- | ---- | 2 | ---- | 2 | ---- | 2 | 2 | ---- | ---- | ---- |
| $TiO_2$ | 15.1 | 15.2 | 15 | 25 | 15.1 | 24.9 | 25 | 20 | 25.1 | 15.1 | 15 | 18 |
| Liquidus, °F | 1,630 | 1,555 | 1,635 | 1,805 | 1,740 | 1,885 | 1,770 | 1,860 | 1,930 | 1,300 | 1,380 | 1,940 |
| α(0–300° C.) × 10⁻⁷ | 117 | 117 | 117 | 118 | 119 | 119 | 120 | 121 | 121 | 122 | 124 | 132 |
| F.S. pt. °C.[1] | 610 | 657 | ---- | 596 | 595 | 634 | ---- | ---- | 585 | 651 | 625 | 599 |
| A. pt. °C.[2] | 478 | 520 | ---- | 484 | 467 | 521 | ---- | ---- | 473 | 510 | 495 | ---- |
| S. pt. °C.[3] | 454 | 496 | ---- | 466 | 444 | 501 | ---- | ---- | 452 | 486 | 476 | ---- |
| Chem. dur.: | | | | | | | | | | | | |
| Water [4] | 2.9 | 3.1 | ---- | 2.0 | 4.4 | 1.7 | ---- | ---- | 2.7 | 4.0 | 4.8 | ---- |
| 1N HCl [5] | 1.5 | 2.3 | ---- | 61.3 | 22.6 | 24.2 | ---- | ---- | 6.9 | 1.1 | 1.3 | ---- |
| N/50 NaOH [6] | 10.0 | 12.2 | ---- | 12.6 | 11.5 | 10.9 | ---- | ---- | 8.6 | 8.0 | ---- | ---- |
| 1% KCN [7] | ---- | ---- | ---- | ---- | ---- | ---- | ---- | ---- | ---- | ---- | ---- | 0.0008 |
| Butt seals: [8] | | | | | | | | | | | | |
| Copper | ---- | ---- | ---- | ---- | ---- | ---- | ---- | ---- | 5,700C | ---- | ---- | ---- |
| Iron | 3,130C | 4,300C | ---- | 420C | 710C | 2,650C | ---- | ---- | 500C | 1,750C | 300C | ---- |
| Inconel "X" α=129×10⁻⁷ (0–300° C.) | ---- | ---- | ---- | ---- | ---- | ---- | ---- | ---- | ---- | ---- | ---- | 1,200T |

TABLE I (PART 2)

| Example No. | 13 | 13A | 14 | 15 | 16 | 17 | 18 | 19 | 20 | 21 | 22 | 23 |
|---|---|---|---|---|---|---|---|---|---|---|---|---|
| Component: | | | | | | | | | | | | |
| $SiO_2$ | 42.5 | 41.1 | 40 | 40 | 38.9 | 54.9 | 37.5 | 40 | 48.11 | 40 | 39.9 | 39.8 |
| $Al_2O_3$ | 2.5 | 2.6 | 2.5 | 2.5 | 2.6 | 3.22 | 2.5 | 2.5 | 3.22 | 2.5 | 2.5 | 2.4 |
| CaO | 2.9 | 4.7 | 5.5 | 5.5 | 2.8 | 3.75 | 4.4 | 4.4 | 3.75 | 3.4 | 4.6 | 3.5 |
| MgO | 2.1 | 3.1 | 4 | 4 | 2 | 2.7 | 3.1 | 3.1 | 2.7 | 2.3 | 3 | 2.1 |
| $Na_2O$ | 14 | 14.5 | 15 | 20 | 15.6 | 14.82 | 10 | 16 | 14.82 | 12 | 15.6 | 17.2 |
| $K_2O$ | 14 | 15.8 | 15 | 10 | 13.9 | 14.82 | 22.5 | 16 | 14.82 | 21.9 | 16 | 16.9 |
| $Li_2O$ | 2 | ---- | ---- | ---- | 1.9 | 2.58 | ---- | 1 | 2.58 | ---- | 2 | ---- |
| $TiO_2$ | 20 | 18.2 | 18 | 18 | 22 | 3.23 | 20 | 17 | 10 | 18.3 | 16.1 | 17.9 |
| Liquidus, °F | 1,670 | 1,825 | 1,940 | 1,925 | 1,715 | 1,500 | 1,885 | 1,830 | 1,490 | 1,560 | 1,775 | 1,690 |
| α(0–300° C.)×10⁻⁷ | 135 | 136 | 136 | 137 | 141 | 140 | ---- | 141 | 141 | 146 | 147 | 149 |
| F.S. pt. °C.[1] | ---- | 583 | 582 | 571 | 534 | 547 | 598 | 543 | 533 | 566 | 521 | 549 |
| A. pt. °C.[2] | ---- | 465 | ---- | ---- | 426 | 404 | ---- | ---- | 410 | 446 | 414 | ---- |
| S. pt. °C.[3] | ---- | ---- | ---- | ---- | 406 | 383 | ---- | ---- | 391 | ---- | ---- | ---- |
| Chem. dur.: | | | | | | | | | | | | |
| Water [4] | ---- | ---- | ---- | ---- | 13.8 | 25.8 | ---- | ---- | 33.0 | ---- | ---- | ---- |
| 1N HCl [5] | ---- | ---- | ---- | ---- | 108.7 | ---- | ---- | ---- | ---- | ---- | ---- | ---- |
| N/50 NaOH [6] | ---- | ---- | ---- | ---- | 10.2 | ---- | ---- | ---- | ---- | ---- | ---- | ---- |
| 1% KCN [7] | ---- | ---- | 0.0008 | 0.0004 | ---- | ---- | ---- | 0.0001 | ---- | 0.0014 | 0.0003 | 0.0009 |
| Butt seals: [8] | | | | | | | | | | | | |
| Copper | ---- | ---- | ---- | ---- | C | 2,800C | ---- | ---- | ---- | ---- | 1,700C | 3,200C |
| Iron | ---- | ---- | ---- | ---- | ---- | ---- | ---- | ---- | ---- | ---- | ---- | ---- |

TABLE I (PART 3)

| Example No. | 24 | 25 | 26 | 27 | 28 | 29 | 30 | 31 | 32 | 33 | 34 |
|---|---|---|---|---|---|---|---|---|---|---|---|
| Component: | | | | | | | | | | | |
| $SiO_2$ | 40 | 39.8 | 29.9 | 40 | 42.5 | 32.5 | 32.9 | 40 | 40 | 40 | 50.5 |
| $Al_2O_3$ | 2.5 | ---- | 5 | 5 | 2.5 | 2.5 | 2.6 | ---- | ---- | ---- | 2.5 |
| CaO | 3.2 | 6 | 3.1 | 2.9 | 2.9 | 2.9 | 3.0 | 5.8 | 5.8 | ---- | ---- |
| MgO | 2.3 | 4.2 | 2.1 | 2.1 | 2.1 | 2.1 | 2.1 | 4.2 | 4.2 | ---- | ---- |
| $Na_2O$ | 22 | 17.8 | 18.2 | 18 | 17.5 | 17 | 17.7 | 16 | 17 | 17 | 18 |
| $K_2O$ | 12 | 15 | 16.4 | 17 | 17.5 | 18 | 16.7 | 17 | 16 | 16 | 9 |
| $Li_2O$ | ---- | ---- | 2 | ---- | ---- | ---- | ---- | 2 | 2 | 2 | ---- |
| $TiO_2$ | 18 | 15.1 | 25 | 15 | ---- | 15 | 24.9 | 15 | 15 | 15 | 15 |
| BaO | ---- | ---- | ---- | ---- | ---- | ---- | ---- | ---- | ---- | 5.8 | 2.9 |
| SrO | ---- | ---- | ---- | ---- | ---- | ---- | ---- | ---- | ---- | 4.2 | 2.1 |
| Liquidus, °F | 1,630 | 1,805 | 1,915 | ---- | ---- | ---- | 1,810 | ---- | 1,805 | 1,750 | 1,365 |
| α (0–300° C.)×10⁻⁷ | 151 | 152 | 153 | 150 | ---- | ---- | 152 | 154 | 153 | 171 | 131 |
| F.S. pt. °C.[1] | 543 | 500 | 532 | ---- | ---- | ---- | 531 | ---- | 500 | 475 | 614 |
| A. pt. °C.[2] | ---- | 392 | 430 | 440 | ---- | ---- | 432 | 398 | 392 | 375 | 485 |
| S. pt. °C.[3] | ---- | 372 | 411 | ---- | ---- | ---- | 413 | ---- | 372 | 360 | 466 |
| Chem. dur.: | | | | | | | | | | | |
| Water [4] | ---- | 41.1 | 34.6 | ---- | ---- | ---- | 33.4 | ---- | 39.3 | 122 | 9.5 |
| 1N HCl [5] | ---- | 259.3 | 187.3 | ---- | ---- | ---- | 166.5 | ---- | 259 | 305 | 16.5 |
| N/50 NaOH [6] | ---- | 14.2 | 11.5 | ---- | ---- | ---- | 13.6 | ---- | 12.9 | 19.8 | ---- |
| 1% KCN [7] | 0.0014 | ---- | ---- | ---- | ---- | ---- | ---- | ---- | ---- | ---- | ---- |
| Butt seals: [8] | | | | | | | | | | | |
| Copper | ---- | 1,830C | 2,800C | ---- | ---- | ---- | 2,690C | ---- | ---- | ---- | ---- |
| Iron | ---- | ---- | ---- | ---- | ---- | ---- | ---- | ---- | ---- | ---- | ---- |

[1] Fiber softening point. ASTM desig. C338–54T.
[2] Annealing point. Temperature at which log viscosity (in poises) is 13.4.
[3] Strain point. Temperature at which log viscosity (in poises) is 14.6.
[4] Mg. sulfate/gm. crushed glass sample treated with double-distilled water at 40° C. for 3 hours. Filtrate acidified with dilute $H_2SO_4$ and evaporated to dryness.
[5] Same as 4 except 1 N HCl used.
[6] Same as 4 except N/50 NaOH used and mg. of sulfate corrected for NaOH originally present.
[7] Crushed 1 gm. sample treated at 60° C. for 4 hours with 30 ml. of 1% KCN, the glass washed and dried and the loss in weight determined.
[8] P.s.i. compression (C) or tension (T) in the glass in single butt seals.

etc., can be employed. For instance, the glass of Example 23 was made in the following specific manner. The following powdered batch materials were employed.

| Batch material: | Parts by wt. |
|---|---|
| Powdered flint | 375.60 |
| Kona spar | 154.80 |
| Burned Dolomite lime | 64.86 |
| Soda ash | 333.60 |
| Calcined potash | 297.00 |
| Titanox ($TiO_2$) | 218.34 |

In the above table the Kona Spar is a commercial raw material analyzing 19.3 weight percent $Al_2O_3$, 67.5 weight percent $TiO_2$, 6.7 weight percent $Na_2O$, 4.6 weight percent $K_2O$, 1.5 weight percent CaO, 0.1 weight percent MgO, less than 0.1 weight percent minor impurities, and the balance volatiles, mainly water. The flint analyzed 99.8 weight percent $SiO_2$, remainder volatiles. The soda ash and potash analyzed, respectively, 58 weight percent $Na_2O$ equivalent and 66.3 weight percent $K_2O$ equivalent, the remainder being volatile materials lost on fusion. The burned dolomite lime analyzed 57.1 weight percent CaO and 41.1 weight percent MgO, the remainder being volatiles. The titanox was 99.0 weight percent $TiO_2$ and the remainder volatiles.

The mixed powdered batch materials were melted in platinum in an electrically heated furnace. Because of the large proportion of carbonates the batch materials were added in small increments over a period of about one and one-half hours. After all of the batch materials had been added, the melt was held at a temperature of about 2500° F. for one hour. This particular glass could be melted at a somewhat lower temperature, if desired.

If one calculates the theoretical resulting glass composition from the foregoing information, assuming no losses by volatilization, it will be seen that this theoretical composition is very close to the actual analyzed composition shown in Table I for Example 23. As is well known, however, in some furnaces and under some melting conditions it is usually necessary to add small excesses of some of the materials in order to take into account small losses by volatilization. For instance, it is not unusual to encounter losses of lithium oxide and potassium oxide under some melting conditions. Careful adjustment for a particular furnace will solve this problem in a routine manner, however.

A preferred group of glasses for sealing to copper and metals of similar high expansion, comprises glasses having a coefficient of thermal expansion (0–300° C.) from 145 to $155 \times 10^{-7}$ and containing 32–44 weight percent $SiO_2$, 2–6 weight percent $Al_2O_3$, 2–5 weight percent CaO, 1.5–4 weight percent MgO, a total of CaO+MgO from 4.5 to 8 weight percent, 10–23 weight percent $Na_2O$, 10–23 weight percent $K_2O$, 0–3 weight percent $Li_2O$, a total of 33–35 weight percent $Na_2O+K_2O+Li_2O$, 15–25 weight percent $TiO_2$, and a sum total of $SiO_2+Al_2O_3+TiO_2$ of 58–62 weight percent. These glasses have a combination of desirable overall properties including chemical durability, fluidity and a fiber softening point below 600° C. Although such glasses have a coefficient of thermal expansion below that of copper, the result is that at the seal area the glass is in compression, which is desirable from a glass strength standpoint. Moreover, copper is a somewhat ductile metal so that a close match in the coefficients of thermal expansion of the glass and the metal is not necessary.

Thus, in general, the glass-to-metal seals of the invention are made using a glass of the invention having a lower or approximately equal coefficient of thermal expansion as that of the particular metal. Thus, at the sealing area, the glass is either under compression or is neutral or it can be under some small tension, although this is not preferred. Tensional stresses in the glass up to 500 p.s.i. are usually acceptable.

The term "metal," as used herein includes metals, metallic alloys and intermetallic compounds.

Glasses of the invention can be formed into desired articles or component parts by conventional glass forming methods, such as blowing, pressing, drawing, slump forming, etc. Articles or components so made can be sealed directly to a high expansion metal part by heating the glass part in the area to be sealed to a temperature above the fiber softening point at which it flows readily. Preferably the metal part is also heated to approximately the same temperature and the two parts brought together to effect the seals, after which the seal is cooled.

Butt seals were made with glasses of the invention to various high expansion metals, such as the seals to copper, iron and Inconel X ($\alpha = 129 \times 10^{-7}$, 0–300° C.) indicated in Table I. One half inch diameter glass rods were pulled, using the respective glasses of the invention. These were ground to a flat planar end surface and were butt-sealed to ½ inch diameter iron or copper rods, also having a planar end surface. In the case of the copper seals, the end of the copper rod was treated before sealing by dipping in 50% nitric acid for a few seconds and then rinsing under running water. The surface was then heated in a flame to form a light oxide coating and quenched in a borax solution. The surface was then heated in a flame to red heat and quenched in water. The step of heating in a flame to form a light oxide coating was sometimes omitted. In the preparation of the iron end surface for sealing, in some cases the freshly ground surface was dipped in concentrated cupric sulphate solution for a few seconds, then rinsed under water and dried. In another case, the treatment of the surface was omitted and no difference could be detected in the quality of the seals.

In forming the seals a gas-oxygen burner was adjusted until a soft yellow flame was produced, and the glass rod was cautiously heated on the end to be sealed by moving in and out of the flame and rotating the rod simultaneously. The temperature of the flame was gradually increased by increasing the oxygen supply and heating was continued until the sample ends became fire polished, but not enough to deform the rod. Thereafter the temperature of the flame was further increased and the end of the metal sample was heated, while the heating of the glass rod was continued to maintain it in a slightly softened condition. The metal rod was heated to a temperature above the temperature of the glass, the samples removed from the flame and pressed together and heating was continued at the seal area until the fusion was completed. Then the glass-metal seal was placed in an annealing furnace which was already at a temperature about 10° C. above the annealing point of the glass rod. After the seal was held in the annealing furnace for about 15 minutes the annealing furnace was allowed to cool at a rate of approximately 3° per minute. Of course, as the temperature approaches closer to room temperature the rate of cooling becomes considerably slower.

After the seals had cooled to approximately room temperature they were ground on two opposite sides so that there were two opposite parallel planar surfaces bridging the seal area. The two planar surfaces were approximately ⅜ inch apart. The ground surfaces were, of course, perpendicular to the interface between the metal and the glass rods sealed together. The existing stress in the glass was determined by measuring the retardation of polarized light by means of a polarimeter. A monochlorobenzene tank was provided for immersing the sample to facilitate the observation of the stress pattern through the ground glass. The retardation data were then used to calculate the stress in lbs. per square inch by the following well-known relationship:

$$S = \frac{R \times K}{1}$$

Where:
S is the stress in p.s.i.
R is the retardation in millimicrons
1 is the light path length in cm.
K is the multiplying factor which is obtained from the following equation:

$$K = \frac{14.22}{C}$$

Where:
C is the stress optical coefficient expressed $m\mu/cm./kg./cm.^2$

Further examples of compositions of the invention are shown in Table II, below:

TABLE II

| Example No. | 35 | 36 | 37 | 38 |
|---|---|---|---|---|
| Component: | | | | |
| SiO₂ | 50.5 | 50.5 | 50.5 | 50.5 |
| Al₂O₃ | 2.5 | 2.5 | 2.5 | 2.5 |
| CaO | 2.9 | 2.9 | 2.9 | 2.9 |
| MgO | 2.1 | 2.1 | 2.1 | 2.1 |
| Na₂O | 19 | 20 | 20.5 | 19.1 |
| K₂O | 9 | 9 | 9 | 9.5 |
| TiO₂ | 14 | 13 | 12.5 | 13.4 |
| (0-300° C.)×10⁻⁷ | 131 | 134 | 136 | 133 |

These glasses were excellent for forming low stress seals directly to Inconel X. Example 35 has a fiber softening point of 618° C., and an annealing point of 490° C. The fiber softening points of Examples 36 and 37 were 610° C. and 602° C., respectively. The liquidus temperatures of Examples 35, 36 and 38 were 1510° C., 1525° C. and 1490° C., respectively. Butt seals were made with these glasses and Inconel X in the manner described in discussing the seals of Table I. The stresses of the seals were 100T (tension) 190T, and 150T for glasses 35, 36 and 38, respectively.

As will be evident to those skilled in the art, various modifications of this invention can be made or followed in the light of the foregoing disclosure and discussion without departing from the spirit and scope of the disclosure or from the scope of the claims.

I claim:
1. A glass suitable for sealing to metals, said glass having an expansion co-efficient (0–300° C.) in the range from 115 to 155×10⁻⁷, an annealing point of more than 325° C., a fiber-softening point below 670° C. and a weight percent composition consisting essentially of 29–56 SiO₂, 8–24 Na₂O, 8–24 K₂O, 0–4 Li₂O, 3–28 TiO₂, 0–6 Al₂O₃, 2.5–7 CaO, 1.5–6 MgO, the total Na₂O+K₂O+Li₂O being from 24 to 36, the total CaO+MgO being from 4 to 11, the total SiO₂+Al₂O₃+TiO₂ being 54–70%, and the total alkali metal oxides +TiO₂ being a maximum of 61%.

2. A glass suitable for sealing to metals, said glass having an expansion co-efficient (0–300° C.) in the range from 115 to 155×10⁻⁷, an annealing point of more than 325° C., a fiber-softening point below 670° C. and a weight percent composition consisting essentially of 29–56 SiO₂, 8–24 Na₂O, 8–24 K₂O, 0–4 Li₂O, 10–26 TiO₂, 0–6 Al₂O₃, 2.5–7 CaO, 1.5–6 MgO, the total Na₂O+K₂O+Li₂O being from 24 to 36 and the total CaO+MgO being from 4 to 11, the total SiO₂+Al₂O₃+TiO₂ being 54–70% and the total alkali metal oxides +TiO₂ being a maximum of 61%.

3. A glass composition suitable for sealing to metals having an expansion co-efficient (0–300° C.) in the range from 115 to 155×10⁻⁷, an annealing point of more than 325° C., a fiber-softening point below 670° C. and said composition consisting essentially of 29–56 weight percent SiO₂, 8–24 weight percent Na₂O, 8–24 weight percent K₂O, 0–4 weight percent Li₂O, 3–28 weight percent TiO₂, 0–6 weight percent Al₂O₃, 4–11 weight percent total metal oxides selected from the group consisting of CaO, MgO and a mixture of CaO and MgO, the total alkali metal oxides being from 24–36 weight percent, the total SiO₂+Al₂O₃+TiO₂ being 54–70 weight percent, and the total alkali metal oxides +TiO₂ being a maximum of 61 weight percent.

4. A glass composition suitable for sealing to metals having an expansion co-efficient (0–300° C.) in the range from 115 to 155×10⁻⁷, an annealing point of more than 325° C., and a fiber-softening point below 670° C., said composition consisting essentially of 29–56 weight percent SiO₂, 8–24 weight percent Na₂O, 8–24 weight percent K₂O, 0–4 weight percent Li₂O, 10–26 weight percent TiO₂, 0–6 weight percent Al₂O₃, 4–11 weight percent total metal oxides selected from the group consisting of CaO, MgO and a mixture of CaO and MgO, the total alkali metal oxides being from 24–36 weight percent, the total SiO₂+Al₂O₃+TiO₂ being 54–70% weight percent, and the total alkali metal oxides +TiO₂ being a maximum of 61%.

5. A glass composition suitable for sealing to copper and metals of similar high expansion, said glass having a co-efficient of thermal expansion (0–300° C.) from 145 to 155×10⁻⁷, an annealing point of more than 325° C., a fiber softening point below 600° C., said composition consisting essentially of 32–44 weight percent SiO₂, 2–6 weight percent Al₂O₃, 2–5 weight percent CaO, 1.5–4 weight percent MgO, a total of CaO+MgO from 4.5 to 8 weight percent, 10–23 weight percent Na₂O, 10–23 weight percent K₂O, 0–3 weight percent Li₂O, a total of 33–35 weight percent Na₂O+K₂O+Li₂O, 15–26 weight percent TiO₂, and a total of SiO₂+Al₂O₃+TiO₂ of 58–62 weight percent.

6. A glass-to-metal seal between a glass according to claim 1 and a metal having co-efficient of thermal expansion at least as high as that of said glass.

7. A glass-to-metal seal between a glass according to claim 3 and a metal having a co-efficient of thermal expansion at least as high as that of said glass.

8. The glass composition as defined in claim 1 and having the following ingredients in the indicated weight percent.

| | |
|---|---|
| SiO₂ | 50.4 |
| Al₂O₃ | 2.6 |
| CaO | 3.1 |
| MgO | 2.1 |
| Na₂O | 9.3 |
| K₂O | 18 |
| TiO₂ | 15.1 |

9. The glass composition as defined in claim 1 and having the following ingredients in the indicated weight percent:

| | |
|---|---|
| SiO₂ | 40 |
| Al₂O₃ | 2.5 |
| CaO | 3.4 |
| MgO | 2.3 |
| Na₂O | 12 |
| K₂O | 21.9 |
| TiO₂ | 18.3 |

(References on following page)

References Cited by the Examiner

UNITED STATES PATENTS

| | | | |
|---|---|---|---|
| 2,720,473 | 10/1955 | Donahey | 106—48 |
| 2,911,312 | 11/1959 | Hoffman | 106—48 |

FOREIGN PATENTS

| | | |
|---|---|---|
| 570,055 | 2/1959 | Canada. |
| 574,029 | 12/1945 | Great Britain. |
| 817,636 | 8/1959 | Great Britain. |
| 865,518 | 4/1961 | Great Britain. |

OTHER REFERENCES

Beals et al.; German application 1,048,532, printed Jan. 8, 1959 (Kl 80b 23/03) 4 pages spec.

SAMUEL H. BLECH, *Primary Examiner.*

TOBIAS E. LEVOW, *Examiner.*